United States Patent
Sawada et al.

(10) Patent No.: US 11,411,239 B2
(45) Date of Patent: Aug. 9, 2022

(54) FUEL CELL SYSTEM

(71) Applicants: TOYOTA JIDOSHA KABUSHIKI KAISHA, Toyota (JP); HINO MOTORS, LTD., Hino (JP)

(72) Inventors: Yutaka Sawada, Nagakute (JP); Yukihide Yokoyama, Toyota (JP)

(73) Assignees: TOYOTA JIDOSHA KABUSHIKI KAISHA, Toyota (JP); HINO MOTORS, LTD., Hino (JP)

( * ) Notice: Subject to any disclaimer, the term of this patent is extended or adjusted under 35 U.S.C. 154(b) by 0 days.

(21) Appl. No.: 17/103,884

(22) Filed: Nov. 24, 2020

(65) Prior Publication Data
US 2021/0159525 A1 May 27, 2021

(30) Foreign Application Priority Data
Nov. 26, 2019 (JP) .............................. JP2019-213391

(51) Int. Cl.
*H01M 8/04746* (2016.01)
*H01M 8/04082* (2016.01)
*H01M 8/249* (2016.01)

(52) U.S. Cl.
CPC ... *H01M 8/04753* (2013.01); *H01M 8/04201* (2013.01); *H01M 8/249* (2013.01)

(58) Field of Classification Search
CPC .................................................. H01M 8/04753
See application file for complete search history.

(56) References Cited

U.S. PATENT DOCUMENTS

| | | | |
|---|---|---|---|
| 2003/0235731 A1* | 12/2003 | Haltiner, Jr. | H01M 8/04089 429/434 |
| 2008/0006461 A1 | 1/2008 | Naganuma | |
| 2011/0294027 A1* | 12/2011 | Kibune | F17C 11/005 429/443 |
| 2013/0095398 A1* | 4/2013 | Kato | F02M 61/04 429/415 |
| 2016/0133970 A1* | 5/2016 | Yamamoto | H01M 8/04992 429/444 |

FOREIGN PATENT DOCUMENTS

JP 2006-188167 A 7/2006

* cited by examiner

*Primary Examiner* — Brian R Ohara
(74) *Attorney, Agent, or Firm* — Hunton Andrews Kurth LLP

(57) ABSTRACT

A fuel cell system includes at least one pressure reducing valve connected to a downstream side of a hydrogen gas tank, a hydrogen gas flow path including a first flow path connected to a downstream side of the pressure reducing valve and a plurality of second flow paths connected to a downstream side of the first flow path and branched from the first flow path, a plurality of injector units, each of which is connected to each of the second flow paths, a plurality of fuel cell stacks, each of which is connected to each of the injector units, and a control unit controlling opening and closing of the injector units. The control unit sets valve closing periods of the injector units to periods deviating from each other such that at least one of the injector units is always opened when the fuel cell system satisfies a predetermined operating condition.

3 Claims, 4 Drawing Sheets

FIG. 3

| EXPERIMENT | DUTY | INJECTOR OPERATION PATTERN |
|---|---|---|
| 1 | 85% | INJ_31, INJ_32 timing diagram (0–200 msec) with intervals P1 |
| 2 | 85% | INJ_31, INJ_32 timing diagram (0–200 msec) |

FIG. 4

| EXPERIMENT | | SLIDING DISTANCE | NUMBER OF SEATING TIMES |
|---|---|---|---|
| 1 | PRESSURE REDUCING VALVE 21 | L | n |
| 1 | PRESSURE REDUCING VALVE 22 | L | n |
| 2 | PRESSURE REDUCING VALVE 21 | 0.5L | 0 |
| 2 | PRESSURE REDUCING VALVE 22 | 0.5L | 0 | n: NUMBER OF INJECTOR OPERATIONS

FUEL CELL SYSTEM

INCORPORATION BY REFERENCE

The disclosure of Japanese Patent Application No. 2019-213391 filed on Nov. 26, 2019 including the specification, drawings and abstract is incorporated herein by reference in its entirety.

BACKGROUND

1. Technical Field

The present disclosure relates to a fuel cell system including a plurality of fuel cell stacks.

2. Description of Related Art

Japanese Unexamined Patent Application Publication No. 2006-188167 (JP 2006-188167A) discloses a fuel cell bus in which a plurality of fuel cell stacks are mounted.

SUMMARY

A large-sized vehicle equipped with a plurality of fuel cell stacks, such as a bus, consumes more hydrogen gas per mileage than a vehicle equipped with one fuel cell stack. On the basis of above, in such a large-sized vehicle, the life of a pressure reducing valve for reducing a pressure of the hydrogen gas that is supplied to the fuel cell stack may be shorter than that of a smaller vehicle. Therefore, there has been a demand for extending the life of the pressure reducing valve. Further, a demand to extend the life of the pressure reducing value is not limited to the large-sized vehicle. There has been also a demand for extending the life of the pressure reducing value in a fuel cell system equipped with the plurality of fuel cell stacks.

The technique of the present disclosure can be implemented as the following aspects.

An aspect of the present disclosure provides a fuel cell system. The fuel cell system includes: a hydrogen gas tank; at least one pressure reducing valve connected to a downstream side of the hydrogen gas tank; a hydrogen gas flow path including a first flow path connected to a downstream side of the pressure reducing valve and a plurality of second flow paths that is connected to a downstream side of the first flow path and branched from the first flow path; a plurality of injector units, each of which is connected to each of the second flow paths and configured to inject hydrogen gas to a downstream side when being opened; a plurality of fuel cell stacks, each of which is connected to each of the injector units; and a control unit that is configured to control opening and closing of the injector units. The control unit is configured to set valve closing periods of the injector units to periods that deviate from each other such that at least one of the injector units is always opened when the fuel cell system satisfies an operating condition that is predetermined. According to the aspect above, when the fuel cell system satisfies the predetermined operating condition, the control unit controls opening and closing of the injector units with the valve closing periods of the injector units being set to the periods that deviate from each other such that at least one of the injector units is always opened. Therefore, a rapid fluctuation of the pressure in the hydrogen gas flow path can be suppressed. Accordingly, the operation of the pressure reducing valve for reducing the pressure in the hydrogen gas flow path to a predetermined pressure can be reduced. Consequently, the life of the pressure reducing valve can be extended.

In the fuel cell system according to the aspect above, the at least one pressure reducing valve may include a plurality of pressure reducing valves, each of which is provided for each of the fuel cell stacks, and the hydrogen gas flow path may further include a connection path that is configured to connect a plurality of the first flow paths and the second flow paths provided corresponding to each of the pressure reducing valves. According to the aspect above, the first flow paths provided corresponding to the pressure reducing valves and the second flow paths are connected by one connection flow path. Therefore, when the pressure of the hydrogen gas in any of the second flow paths rises to exceed the predetermined pressure, the hydrogen gas flows to another second flow path through the connection flow path. Accordingly, the reverse flow of the hydrogen gas that is a flow of hydrogen gas from the downstream side of the pressure reducing valve toward the upstream side of the pressure reducing valve can be suppressed.

In the fuel cell system of the above aspect, the operating condition may include that the fuel cell system is not performing an intermittent operation that temporarily stops power generation by the fuel cell stacks. According to the aspect above, the control unit controls opening and closing of the injector units with the valve closing periods of the injector units being set to the periods that deviate from each other such that at least one of the injector units is always opened, except when the power generation by the fuel cell stacks is unnecessary. Therefore, the life of the pressure reducing valve can be extended and the fuel cell system can be operated properly.

The present disclosure can be realized in various forms, for example, a method for controlling the fuel cell system, a fuel cell vehicle, a method for controlling the fuel cell system mounted on a vehicle, a computer for realizing these control methods, and a non-transitory storage medium recording the computer program.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram for explaining experimental conditions;

FIG. 4 is a diagram for explaining experimental results; and

DETAILED DESCRIPTION OF EMBODIMENTS

A. First Embodiment

Figure 1:
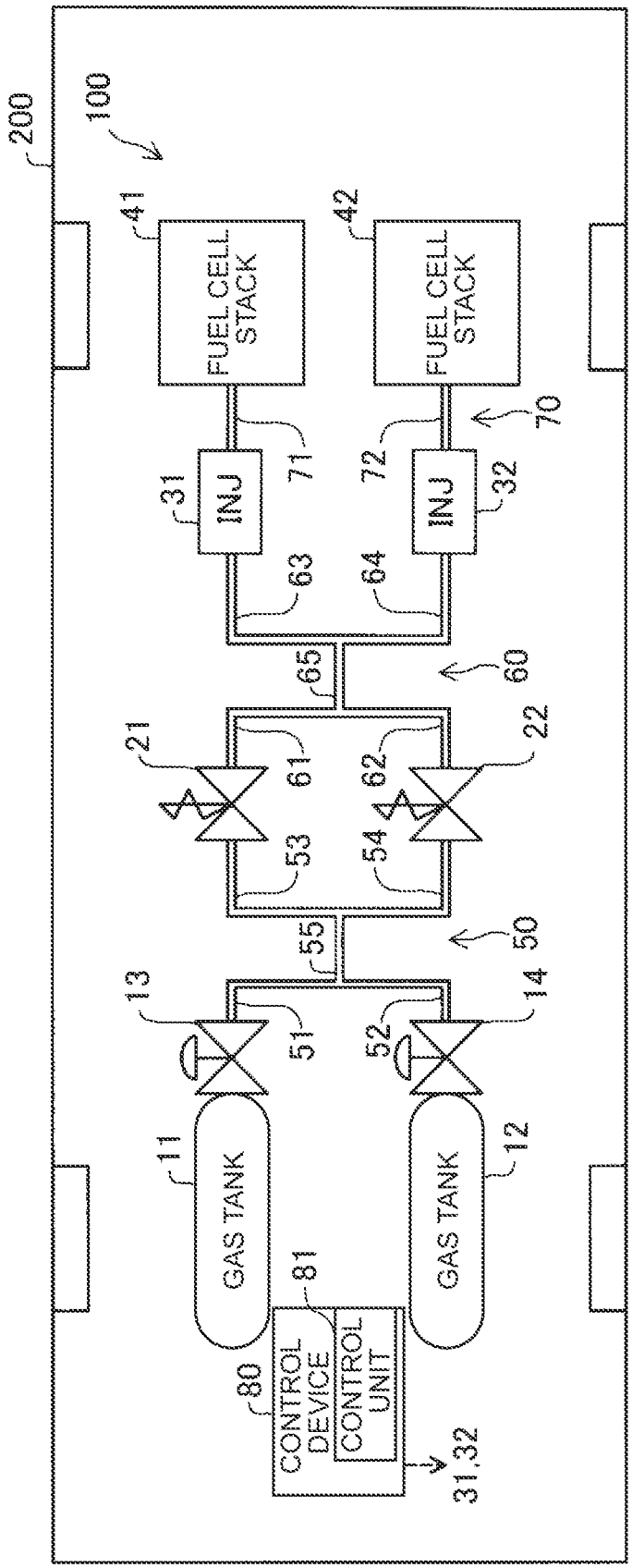
FIG. 1 is a diagram showing a schematic configuration of a fuel cell system.

FIG. 1 is a diagram showing a schematic configuration of a fuel cell system 100 according to a first embodiment of the present disclosure. In the first embodiment, the fuel cell system 100 is mounted on a vehicle 200 and outputs electric power as a power source of the vehicle 200 in response to a request from a driver.

The fuel cell system 100 includes pressure reducing valves 21, 22, a high pressure pipe 50, an intermediate pressure pipe 60, injector units 31, 32, fuel cell stacks 41, 42, and a control device 80 having a control unit 81. In the first embodiment, the fuel cell system 100 further includes hydrogen gas tanks 11, 12, main stop valves 13, 14, and a low pressure pipe 70. Although not shown, the fuel cell system 100 further includes a cathode gas supply system including an air compressor for supplying air to the fuel cell stacks 41, 42 and a cathode gas pipe, etc.

The hydrogen gas tanks 11, 12 are connected to hydrogen gas inlets of the fuel cell stacks 41, 42 via the high pressure pipe 50, the intermediate pressure pipe 60, and a low pressure pipe 70, and the hydrogen gas charged in the hydrogen gas tanks 11, 12 is supplied to the fuel cell stacks 41, 42. The main stop valves 13, 14, the pressure reducing valves 21, 22, and the injector units 31, 32 are provided in this order from the upstream side, that is, from the side close to the hydrogen gas tanks 11, 12.

The high pressure pipe 50 is a pipe that connects the main stop valves 13, 14 and the pressure reducing valves 21, 22. The high pressure pipe 50 includes a first high pressure pipe 51, a second high pressure pipe 52, a connection pipe 55, a third high pressure pipe 53, and a fourth high pressure pipe 54. The main stop valve 13 is connected to the first high pressure pipe 51, and the main stop valve 14 is connected to the second high pressure pipe 52. The main stop valve 13 is opened and closed under the control of the control unit 81 to supply the hydrogen gas in the hydrogen gas tank 11 to the first high pressure pipe 51. The main stop valve 14 is opened and closed under the control of the control unit 81 to supply the hydrogen gas in the hydrogen gas tank 12 to the second high pressure pipe 52. Downstream ends of the first high pressure pipe 51 and the second high pressure pipe 52 are connected to the connection pipe 55 that is one pipe. The connection pipe 55 branches into the third high pressure pipe 53 and the fourth high pressure pipe 54 on the downstream side. The pressure reducing valve 21 is connected to the third high pressure pipe 53, and the pressure reducing valve 22 is connected to the fourth high pressure pipe 54. The main stop valve 13 and the pressure reducing valve 21 may be directly connected and the main stop valve 14 and the pressure reducing valve 22 may be directly connected, without the connection pipe 55 intervening therebetween.

The intermediate pressure pipe 60 is a pipe that connects the pressure reducing valves 21, 22 and the injector units 31, 32. The intermediate pressure pipe 60 includes a first intermediate pressure pipe 61, a second intermediate pressure pipe 62, a connection pipe 65, a third intermediate pressure pipe 63, and a fourth intermediate pressure pipe 64. The pressure reducing valve 21 is connected to the first intermediate pressure pipe 61, and the pressure reducing valve 22 is connected to the second intermediate pressure pipe 62. Downstream ends of the first intermediate pressure pipe 61 and the second intermediate pressure pipe 62 are connected to the connection pipe 65 that is one pipe. The connection pipe 65 branches into the third intermediate pressure pipe 63 and the fourth intermediate pressure pipe 64 on the downstream side. The intermediate pressure pipe 60 is also referred to as a "hydrogen gas passage", and the first intermediate pressure pipe 61, the second intermediate pressure pipe 62, and the connection pipe 65 are each referred to as a "first flow path". The connection pipe 65 is also referred to as a "connection flow path". Further, the third intermediate pressure pipe 63 and the fourth intermediate pressure pipe 64 are each referred to as a "second flow path".

The pressure reducing valves 21, 22 are valves that adjust the pressure of the hydrogen gas in the intermediate pressure pipe 60 to a predetermined pressure. Although not illustrated, the pressure reducing valves 21, 22 are housed in a housing that communicates with the high pressure pipe 50 side and the intermediate pressure pipe 60 side. The pressure reducing valves 21, 22 each include a valve element that slides in the housing and a valve seat on which the valve element can be seated. The pressure reducing valves 21, 22 each have a function to maintain the pressure in the intermediate pressure pipe 60 at the predetermined pressure. For example, in the pressure reducing valves 21, 22, the valve element slides such that the pressure in the intermediate pressure pipe 60 reaches the predetermined pressure in accordance with a pressure fluctuation in the intermediate pressure pipe 60. When the pressure fluctuation is large, a distance in which the valve element slides in the housing (hereinafter referred to as a sliding distance) becomes larger compared to the case where the pressure fluctuation is small. Further, in the pressure reducing valves 21, 22, when the pressure in the intermediate pressure pipe 60 rises to exceed the predetermined pressure, the valve element comes into contact with the valve seat, and a flow of gas from the high pressure pipe 50 to the intermediate pressure pipe 60 is stopped.

The injector units 31, 32 are connected to the intermediate pressure pipe 60. The injector units 31, 32 each include one or more injectors. Each injector is opened and closed under the control of the control unit 81 to inject the hydrogen gas toward the low pressure pipe 70 side. Specifically, the injector is opened when energized and injects the hydrogen gas toward the downstream side, and closed when deenergized and stops injection of the hydrogen gas toward the downstream side. Opening the injector unit 31 means opening of at least one injector among the injectors included in the injector unit 31. Closing the injector unit 31 means closing of all of the injectors included in the injector unit 31. The same applies to the injector unit 32.

The low pressure pipe 70 includes a first low pressure pipe 71 and a second low pressure pipe 72. The injector unit 31 is connected to the third intermediate pressure pipe 63 and injects the hydrogen gas toward the fuel cell stack 41 through the first low pressure pipe 71. Further, the injector unit 32 is connected to the fourth intermediate pressure pipe 64 and injects the hydrogen gas toward the fuel cell stack 42 through the second low pressure pipe 72.

The control device 80 is configured as an electronic control unit (ECU) including a central processor unit (CPU), a memory, and an interface, which are not illustrated. The control device 80 functions as the control unit 81 by expanding and executing the program stored in the memory. The control unit 81 acquires a measurement result of a sensor (not illustrated) and controls an operation of each unit in the fuel cell system 100.

Further, the control unit 81 causes the fuel cell stacks 41, 42 to generate power according to power required for the fuel cell system 100. For example, the control unit 81 sets a target pressure value for the first low pressure pipe 71 and the target pressure value for the second low pressure pipe 72 such that the total power generated by the fuel cell stacks 41, 42 matches the required power. The control unit 81 acquires a measurement result of a pressure sensor (not illustrated) that is provided in the first low pressure pipe 71, and controls the injector unit 31 such that the pressure value of the first low pressure pipe 71 becomes the target pressure value. The control unit 81 acquires a measurement result of a pressure sensor (not illustrated) that is provided in the second low pressure pipe 72, and controls the injector unit 32 such that the pressure value of the second low pressure pipe 72 becomes the target pressure value.

Further, the control unit 81 executes a hydrogen gas supply control in which the injector units 31, 32 are controlled with valve closing periods of the injector units 31, 32 being set to periods that deviate from each other such that at least one of the injector units 31, 32 is always opened when the fuel cell system 100 satisfies a predetermined operating condition. The control above is executed to suppress fluctuations in the pressure value in the intermediate pressure pipe 60 between the injector units 31, 32 and the pressure reducing valves 21, 22.

The predetermined operating condition includes that the fuel cell system 100 is not performing an intermittent operation. The intermittent operation is an operation in which the power generation by the plurality of fuel cell stacks 41, 42 in the fuel cell system 100 is temporarily stopped. The intermittent operation is performed, for example, when the required power in the fuel cell system 100 is small and a power generation command value from the fuel cell stacks 41, 42 is set to zero. The operating condition above may include that the fuel cell system 100 is not performing a regenerative operation. The regenerative operation is an operation in which regenerative braking is performed to regenerate electric power generated by a drive motor (not illustrated) included in the vehicle 200 in which the fuel cell system 100 is mounted to generate a braking force of the vehicle 200. During a majority of a period during operation of the fuel cell system 100, for example, at least 80% of the period, the plurality of fuel cell stacks 41, 42 continue to generate the electric power, and the predetermined operating condition is satisfied. Further, the predetermined operating condition includes that the sum of a duty that is a valve opening period per cycle of each injector unit 31, 32 is 100% or more.

Figure 2:
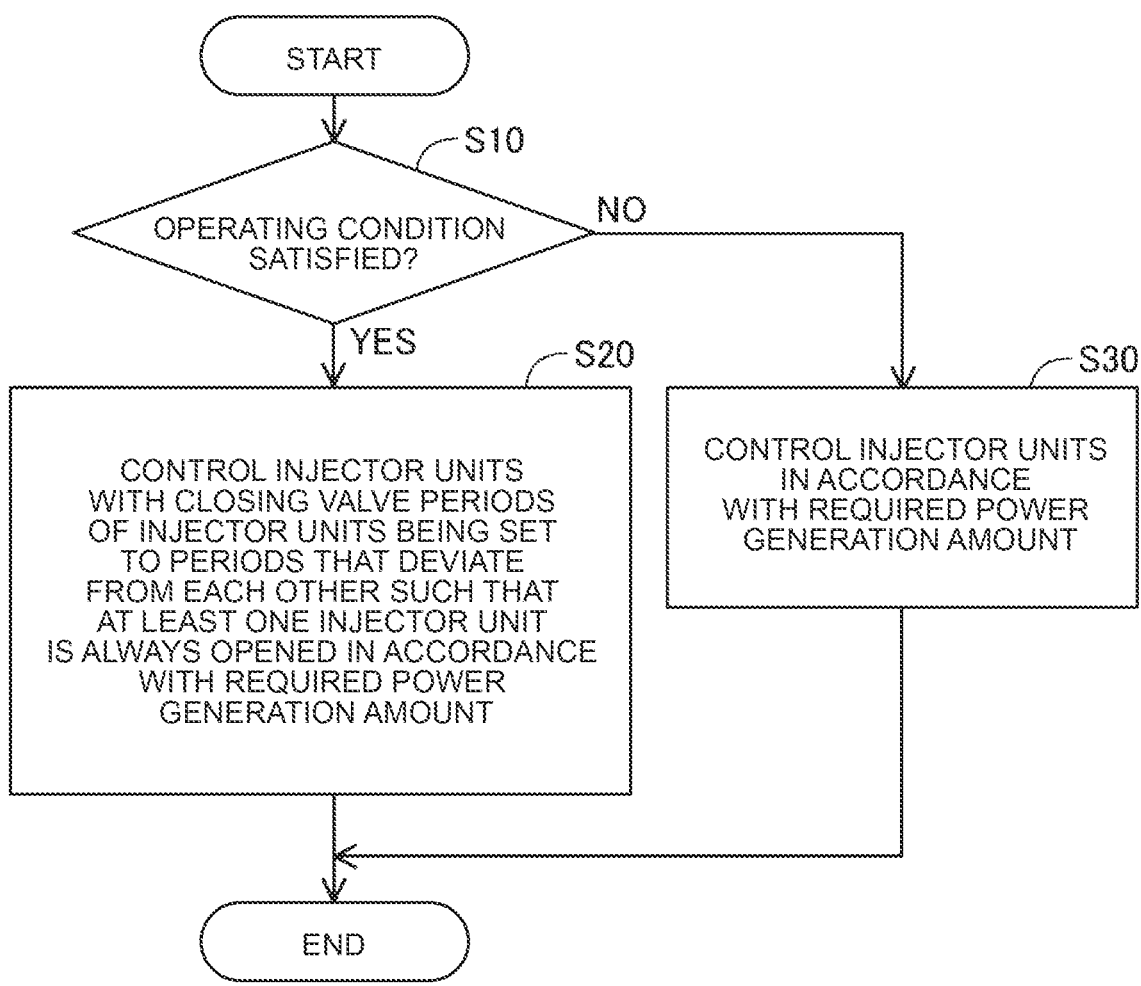
FIG. 2 is a process diagram showing a hydrogen gas supply control.

FIG. 2 is a process diagram showing the hydrogen gas supply control executed by the control unit 81. The control is repeatedly executed after the fuel cell system 100 is started and until the fuel cell system 100 is stopped. In step S10, the control unit 81 determines whether the fuel cell system 100 satisfies the predetermined operating condition described above. When the fuel cell system 100 does not satisfy the predetermined operating condition (NO in step S10), the control unit 81 controls the injector units 31, 32 in step S30 in accordance with a required power generation amount. In step S30, the control unit 81 closes the injector units 31, 32 when the required power generation amount is zero.

Further, when the predetermined operating condition is satisfied (YES in step S10), the control unit 81 controls opening and closing of the injector units 31, 32 with the valve closing periods of the injector units 31, 32 being set to the periods that deviate from each other such that at least one of the injector units 31, 32 is always opened in step S20.

FIG. 3 is a diagram for explaining two experiments (Experiments 1 and 2) in which the opening and closing timings of the plurality of injector units are changed. The experiments were conducted using the fuel cell system 100 shown in FIG. 1. A drive cycle of the injector units 31, 32 in Experiments 1 and 2 is 100 msec. The drive cycle is a cycle from when the injector unit is opened at this time to when the injector unit is closed and when the injector unit is opened the next time. Operation patterns of the injector units 31, 32 in Experiments 1 and 2 are as follows.

Experiment 1

The opening and closing timing of the injector unit 31 and the opening and closing timing of the injector unit 32 are set to be the same. The duty of each injector unit 31, 32 is 85%. In Experiment 1, assuming that the time when the injector unit 31 is opened is 0 msec., the routine in which the injector units 31, 32 are opened up to 85 msec. and closed from 85 msec. to 100 msec. is repeated. In Experiment 1, there is one period (see P1 in FIG. 3) in which any one of the injector units 31, 32 is not opened in one cycle.

Experiment 2

The valve closing periods of the injector units 31, 32 are set to the periods that deviate from each other such that at least one of the injector units 31, 32 is always opened. The duty of each injector unit 31, 32 is 85%. In Experiment 2, assuming that the time when the injector unit 31 is opened is 0 msec., the routine in which the injector unit 31 is opened up to 85 msec. and closed from 85 msec. to 100 msec. is repeated. Further, the routine in which the injector unit 32 is opened at a time 15 msec. after the injector unit 31 is opened, opened for 85 msec., and closed after 85 msec. elapses is repeated. In Experiment 2, the valve closing periods of the injector units 31, 32 are deviated from each other, and there is no period in which neither of the injector units 31, 32 is open.

In the above Experiments 1 and 2, the inventors investigated the sliding distance of each of the pressure reducing valves 21, 22 and the number of seating times of the valve element during the same period. As a result, when the sliding distance in Experiment 1 was set to a reference value L, the sliding distance in Experiment 2 was 0.5 L, which was shorter than that in Experiment 1. Further, in Experiment 1, the pressure reducing valves 21, 22 were seated during the period in which neither of the injector units 31, 32 was open (see P1 in FIG. 3). In Experiment 1, the number of seating times of the pressure reducing valves 21, 22 was n that is the same as the number of operating times of the injector units in one cycle. On the other hand, in Experiment 2, the number of seating times of the pressure reducing valves 21, 22 was zero.

On the basis of the experimental results above, it has been proved that the sliding distance of the pressure reducing valves 21, 22 is shortened and the number of seating times of the pressure reducing valves 21, 22, is reduced by controlling opening and closing of the injector units 31, 32 with the valve closing periods of the injector units 31, 32 being set to the periods that deviate from each other such that at least one of the plurality of injector units 31, 32 is always opened.

According to the first embodiment, when the fuel cell system 100 satisfies the predetermined operation condition, opening and closing of the injector units 31, 32 are controlled with the valve closing periods of the injector units 31, 32 being set to the periods that deviate from each other such that at least one of the plurality of injector units 31, 32 is always opened. Therefore, it is possible to suppress a rapid fluctuation in the pressure in the intermediate pressure pipe 60 that functions as the hydrogen gas flow path. Consequently, a first effect is achieved that the sliding distance and the number of seating times of the pressure reducing valves 21, 22 for reducing the pressure in the intermediate pressure pipe 60 to the predetermined pressure are reduced, which realizes extension of life of the pressure reducing valves 21, 22. Further, the extended life of the pressure reducing valves 21, 22 can also extend a guaranteed mileage of the vehicle 200 to be longer.

Further, for example, a system is assumed in which the intermediate pressure pipe 60 functioning as the hydrogen gas flow path does not include the connection pipe 65, the first intermediate pressure pipe 61 and the third intermediate pressure pipe 63 are connected to each other, and the second intermediate pressure pipe 62 and the fourth intermediate pressure pipe 64 are connected to each other. In the system above, for example, when the pressure in the first intermediate pressure pipe 61 and the pressure in the third intermediate pressure pipe 63 rise to exceed a predetermined pressure, the hydrogen gas in the first intermediate pressure pipe 61 and in the third intermediate pressure pipe 63 flows in a reverse direction in the pressure reducing valve 21 toward the pressure reducing valve 22 side. However, according to the first embodiment, the first intermediate pressure pipe 61 and the second intermediate pressure pipe 62 as the first flow paths that are respectively connected to the pressure reducing valves 21, 22 and the third intermediate pressure pipe 63 and the fourth intermediate pressure pipe 64 that are respectively connected to the injector units 31, 32 are connected via the connection pipe 65 that is one pipe. Therefore, a second effect is achieved in which the reverse flow of the hydrogen gas as described above can be suppressed, which extends the life of the pressure reducing valves 21, 22.

Further, according to the first embodiment, the hydrogen gas supply control is executed when the fuel cell system 100 satisfies the predetermined operation condition. A third effect is achieved in which the life of the pressure reducing valves 21, 22 can be extended because the predetermined operating condition is satisfied for most of the period during the operation of the fuel cell system 100, and the fuel cell system 100 can be operated properly because the hydrogen gas supply control is not executed when the operating condition is not satisfied.

In the first embodiment, the number of the pressure reducing valves 21, 22 is the same as the number of fuel cell stacks 41, 42. Therefore, a pressure reducing valve having a pressure adjusting function that is similar to that of a pressure reducing valve used in a vehicle having one fuel cell stack can be utilized. Accordingly, it is possible to suppress a cost required to build the fuel cell system 100 including the plurality of fuel cell stacks 41, 42.

B. Second Embodiment

Figure 5:
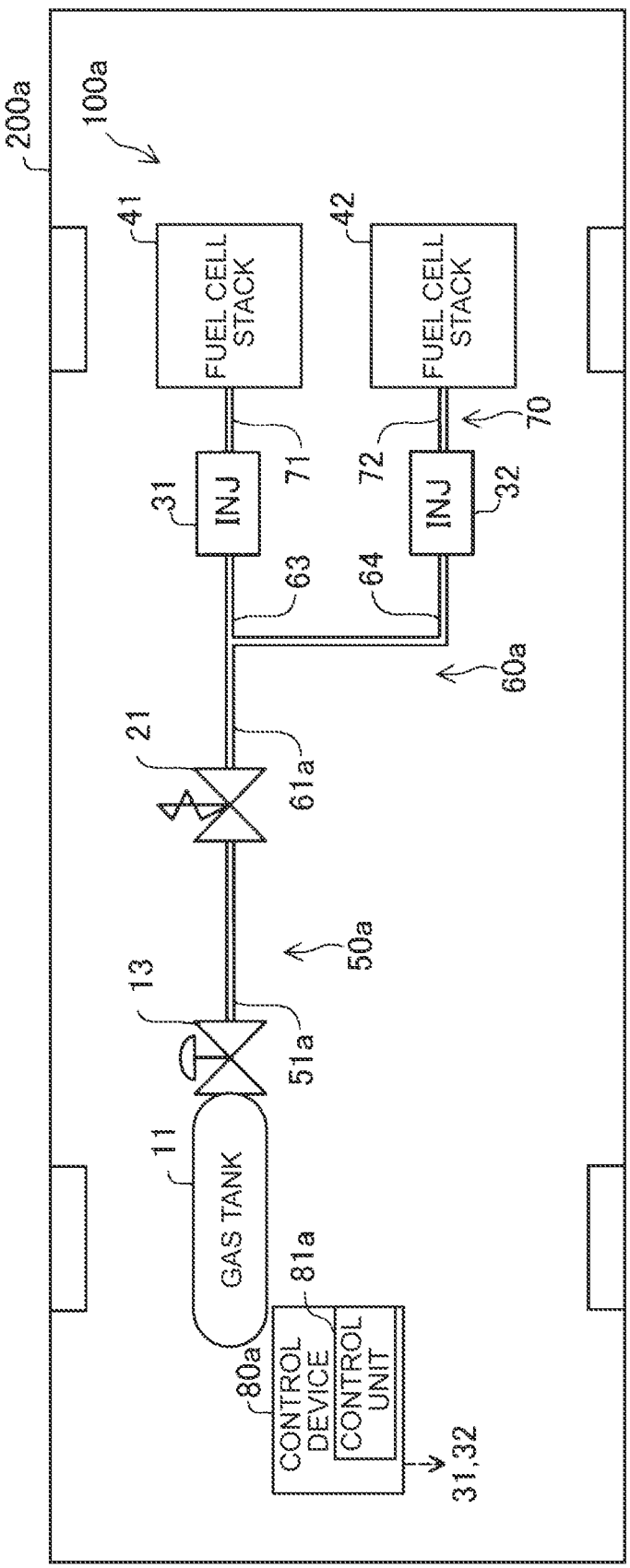
FIG. 5 is a diagram showing a schematic configuration of a fuel cell system according to a second embodiment.

FIG. 5 is a diagram showing a schematic configuration of a fuel cell system 100a according to a second embodiment. The fuel cell system 100a is mounted on a vehicle 200a. The fuel cell system 100a is different from the fuel cell system 100 of the first embodiment in that there is one hydrogen gas tank and one pressure reducing valve, and in that the fuel cell system 100a has different configurations of a high pressure pipe 50a and an intermediate pressure pipe 60a from those of the fuel cell system 100 of the first embodiment. Specifically, in the fuel cell system 100a, the main stop valve 13 and the pressure reducing valve 21 that are disposed downstream of the hydrogen gas tank 11 are connected by a first high pressure pipe 51a, and the pressure reducing valve 21 and a first intermediate pressure pipe 61a are connected to each other. Further, a first intermediate pressure pipe 61a is branched into the third intermediate pressure pipe 63 and the fourth intermediate pressure pipe 64. In the second embodiment, similar to the control unit 81 of the first embodiment, a control unit 81a included in a control device 80a executes, when the fuel cell system 100a satisfies a predetermined operation condition, the hydrogen gas supply control in which opening and closing of the injector units 31, 32 are controlled with the valve closing periods of the injector units 31, 32 being set to the periods that deviate from each other such that any one of the injector units 31, 32 is always opened. Also according to the second embodiment, the first and third effects of the first embodiment are achieved.

C. Other Embodiment

In each of the above first and second embodiments, the number of fuel cell stacks and the number of injector units may be greater than two. Also according to this embodiment, the same effect as that of each of the first and second embodiments can be achieved.

In the first and second embodiments above, the vehicles 200, 200a in which the fuel cell systems 100, 100a are mounted are buses. However, the fuel cell systems 100, 100a may be mounted in other large-sized vehicles such as trucks or commercial vehicles. Further, the fuel cell systems 100, 100a are not limited to vehicles, and may be mounted on a moving body such as a ship, a train, or a robot, or may be installed in a stationary state.

The present disclosure is not limited to the first and second embodiments above, and can be implemented with various configurations without departing from the scope of the present disclosure. For example, the technical features in the embodiments, examples, and modifications corresponding to the technical features in the aspects described in the summary of the disclosure may be appropriately replaced or combined in order to solve part of or all of the above-mentioned issues or in order to achieve part of or all of the above-mentioned effects. In addition, unless described herein as essential, the technical features can be deleted as appropriate.

What is claimed is:

1. A fuel cell system comprising:
a hydrogen gas tank;
at least one pressure reducing valve connected to a downstream side of the hydrogen gas tank;
a hydrogen gas flow path including a first flow path connected to a downstream side of the pressure reducing valve and a plurality of second flow paths that is connected to a downstream side of the first flow path and branched from the first flow path;
a plurality of injector units, each of which is connected to each of the second flow paths and configured to inject hydrogen gas to a downstream side when being opened;
a plurality of fuel cell stacks, each of which is connected to each of the injector units; and
a control unit that is configured to control opening and closing of the injector units, wherein the control unit is configured to set valve closing periods of the injector units to periods that deviate from each other such that at least one of the injector units is always opened when the fuel cell system satisfies an operating condition that is predetermined,
wherein the at least one pressure reducing valve includes a plurality of pressure reducing valves, each of which is provided for each of the plurality of fuel cell stacks.

2. The fuel cell system according to claim 1, wherein:
the hydrogen gas flow path further includes a connection path that is configured to connect a plurality of the first flow paths and the second flow paths provided corresponding to each of the pressure reducing valves.

3. The fuel cell system according to claim 1, wherein the operating condition includes that the fuel cell system is not performing an intermittent operation that temporarily stops power generation by the fuel cell stacks.

\* \* \* \* \*